United States Patent
Oyama

(10) Patent No.: US 9,233,711 B2
(45) Date of Patent: Jan. 12, 2016

(54) LANE KEEPING CONTROL DEVICE OF VEHICLE

(71) Applicant: FUJI JUKOGYO KABUSHIKI KAISHA, Tokyo (JP)

(72) Inventor: Hajime Oyama, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/570,884

(22) Filed: Dec. 15, 2014

(65) Prior Publication Data

US 2015/0183460 A1    Jul. 2, 2015

(30) Foreign Application Priority Data

Dec. 27, 2013 (JP) ................. 2013-271583

(51) Int. Cl.
*B62D 11/00* (2006.01)
*B62D 55/02* (2006.01)
*B62D 6/00* (2006.01)
*B62D 15/02* (2006.01)

(52) U.S. Cl.
CPC ................ *B62D 6/00* (2013.01); *B62D 15/025* (2013.01)

(58) Field of Classification Search
CPC ....... B62D 15/025; B62D 6/00; B60W 30/12; B60T 8/17557
USPC .......... 701/41; 180/6.24, 6.44, 6.6, 9.38, 222, 180/37, 240, 280, 410, 419, 420; 340/465, 340/426.3
See application file for complete search history.

(56) References Cited

U.S. PATENT DOCUMENTS

| 7,302,328 | B2* | 11/2007 | Kato | B60T 8/1764 180/443 |
| 2004/0193374 | A1* | 9/2004 | Hac | B60K 31/0008 701/301 |
| 2004/0199316 | A1* | 10/2004 | Kato | B62D 6/04 701/41 |
| 2005/0080532 | A1* | 4/2005 | Kato | B60T 8/1764 701/41 |
| 2011/0015850 | A1* | 1/2011 | Tange | B60W 30/12 701/116 |

FOREIGN PATENT DOCUMENTS

JP    2007-326534 A    12/2007

* cited by examiner

*Primary Examiner* — Muhammad Shafi
(74) *Attorney, Agent, or Firm* — McDermott Will & Emery LLP

(57) ABSTRACT

A lane keeping control device of a vehicle sets a motor basic current according to driver steering torque, calculates a feed-forward control amount on the basis of a traveling road shape, calculates a deviation between positions of a vehicle track and a target course at a forward observation point to calculate a lateral position feedback control amount, calculates a yaw angle feedback control amount on the basis of a yaw angle of the vehicle, sets a lateral position feedback gain of the lateral position feedback amount to be larger when a traveling road width is large than when the traveling road width is small, and sets a yaw angle feedback gain of the yaw angle feedback control amount to be larger when the traveling road width is small than when the traveling road width is large.

4 Claims, 8 Drawing Sheets

LANE KEEPING CONTROL DEVICE OF VEHICLE

CROSS-REFERENCE TO RELATED APPLICATION

The present application claims priority from Japanese Patent Application No. 2013-271583 filed on Dec. 27, 2013, the entire contents of which are hereby incorporated by reference.

BACKGROUND

1. Technical Field

The present invention relates to a lane keeping control device of a vehicle that drives an electric power steering motor to travel along a set target course.

2. Related Art

In recent years, for the purpose of reducing traffic accidents and burdens on drivers, various techniques have been developed and proposed for lane keeping control devices that support, assist, and control steering so that vehicles can travel along a set target course. For instance, Japanese Unexamined Patent Application Publication (JP-A) No. 2007-326534 discloses a technique for a vehicular lane keeping support device that detects lateral displacement from the vicinity of a lane center of a vehicle on the basis of lane shape information obtained by an image captured by a camera and calculates, on the basis of the detected lateral displacement, reference steering torque to be applied to the vehicle to enable the vehicle to travel along the lane. According to the technique, steering torque to be applied to the vehicle is changed from the reference steering torque by increasing a dead zone or reducing a gain of the steering torque with respect to the lateral displacement when a lane width of a road is large compared with when the lane width is small.

When a driver travels on a road, as illustrated in FIG. 8A, if the driver travels on a traveling road having a large traveling road width (Wr>C: Wr represents traveling road width and C represents reference width set in advance) like an expressway, it is possible to assist steering of the driver and perform natural and stable lane keeping control along a target course by performing feedback control to eliminate a deviation from a target course set on the traveling road (e.g., the center of the traveling road). On the other hand, as illustrated in FIG. 8B, if the driver travels on a traveling road having a small traveling road width (Wr<C) like a general road, obstacles such as parked vehicles and oncoming vehicles are often present on the traveling road. The driver needs to travel while avoiding the obstacles. The driver has a lot of difficulties in traveling a target course on the traveling road. Taking into account such actual traveling environments, the lane keeping control device disclosed in JP-A No. 2007-326534 attempts to improve lateral position retaining performance in a lane by intensifying control when a road width decreases. Then, on the contrary, the lane keeping control for traveling along the target course prevents the steering of the driver.

SUMMARY OF THE INVENTION

The present invention has been devised in view of the above circumstances and it is an object of the present invention to provide a lane keeping control device of a vehicle that allows a driver to perform natural and stable steering support according to lane keeping control on a traveling road having a large traveling road width like an expressway and executes optimum lane keeping control taking into account an actual traveling environment without interfering with avoidance steering of the driver on a traveling road having a small traveling road width like a general road.

An aspect of the present invention provides a lane keeping control device of a vehicle that sets a target course on which the vehicle is to travel, calculates a control amount for an electric power steering motor on the basis of at least a deviation from the target course, and controls the vehicle to travel along the target course. The lane keeping control device of a vehicle includes: a lateral position feedback controller that calculates, on the basis of the deviation between the target course and a position of an estimated vehicle track of the vehicle, a control amount by feedback control such that the deviation of the position is eliminated; and a lateral position feedback gain setter that sets an influence degree of the control amount by the lateral position feedback controller to be higher when a traveling road width is large than when the traveling road width is small.

BRIEF DESCRIPTION OF THE DRAWINGS

FIGS. 8A and 8B are explanatory diagrams of traveling states in an actual traveling environment, in which FIG. 8A is an explanatory diagram of traveling on an expressway and FIG. 8B is an explanatory diagram of traveling on a general road.

DETAILED DESCRIPTION

An example of the present invention is described with reference to the drawings.

Figure 1:
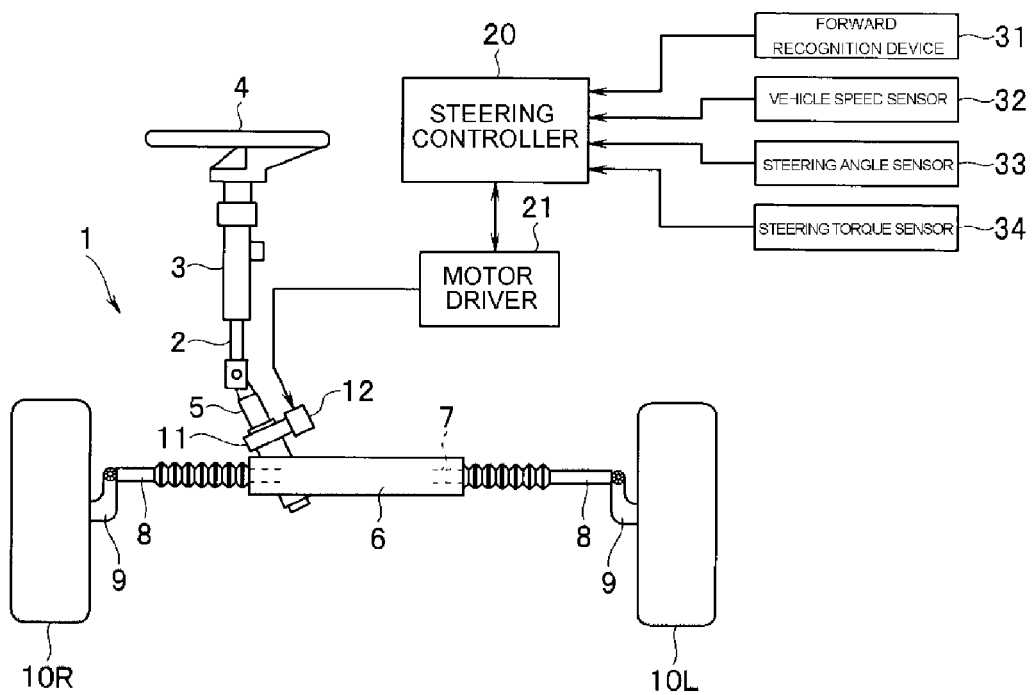
FIG. 1 is a configuration explanatory diagram of a steering system of a vehicle according to an example of the present invention.

In FIG. 1, reference numeral 1 denotes an electric power steering device that can freely set a steering angle independently from a driver input. In the electric power steering device 1, a steering shaft 2 is turnably supported by a vehicle body frame (not illustrated in the figure) via steering column 3. One end of the steering shaft 2 extends towards a driver's seat, and the other end extends towards an engine room. A steering wheel 4 is fixed to the end of the steering shaft 2 extending towards driver's seat. A pinion shaft 5 is connected to the end extending towards the engine room.

In the engine room, a steering gear box 6 extending to the vehicle width direction is disposed. A rack shaft 7 is inserted through and supported by the steering gear box 6 to be capable of reciprocatingly moving. A pinion formed in the pinion shaft 5 is meshed with a rack (not illustrated in the figure) formed in the rack shaft 7 to configure a steering gear mechanism of a rack-and-pinion type.

Left and right ends of the rack shaft 7 respectively project from ends of the steering gear box 6. Front knuckles are connected to the ends via tie rods 8. The front knuckles 9 rotatably support left and right wheels 10L and 10R functioning as steered wheels and are steerably supported by the vehicle body frame. Therefore, when the steering wheel 4 is operated to rotate the steering shaft 2 and the pinion shaft 5, the rack shaft 7 moves in the left and right direction according to the rotation of the pinion shaft 5. The front knuckles 9 turn about king pin shafts (not illustrated in the figure) according to the movement, whereby the left and right wheels 10L and 10R are steered in the left and right direction.

An electric power steering motor (an electric motor) 12 is connected to the pinion shaft 5 via an assist transmission mechanism 11. The electric motor 12 assists steering torque applied to the steering wheel 4 and adds steering torque for obtaining a set steering angle (a target steering angle). A motor driver 21 receives a target current Icmd serving as a control output value from a steering controller 20 to drive the electric motor 12.

A forward recognition device 31 that recognizes left and right lane lines in the front as the shape of a traveling road, acquires lane line position information, and recognizes a traveling road shape is connected to the steering controller 20. A vehicle speed sensor 32 that detects vehicle speed V, a steering angle sensor 33 that detects a steering angle (a steer angle) θp, and a steering torque sensor 34 that detects steering torque Td are also connected to the steering controller 20.

The forward recognition device 31 includes a pair of CCD cameras and a stereo image processing device. The CCD cameras are attached to, for instance, the front of the ceiling in the interior and capture in stereo an image of a target on the outside from different viewpoints. The stereo image processing device processes image data from the CCD cameras.

The processing of the image data from the CCD camera in the stereo image processing device of the forward recognition device 31 is performed, for instance, as described below. First, the stereo image processing device uses a pair of stereo images in a traveling direction of the vehicle captured by the CCD cameras to calculate distance information based on a deviation of positions corresponding to the pair of stereo images and generate a distance image.

Figure 6:
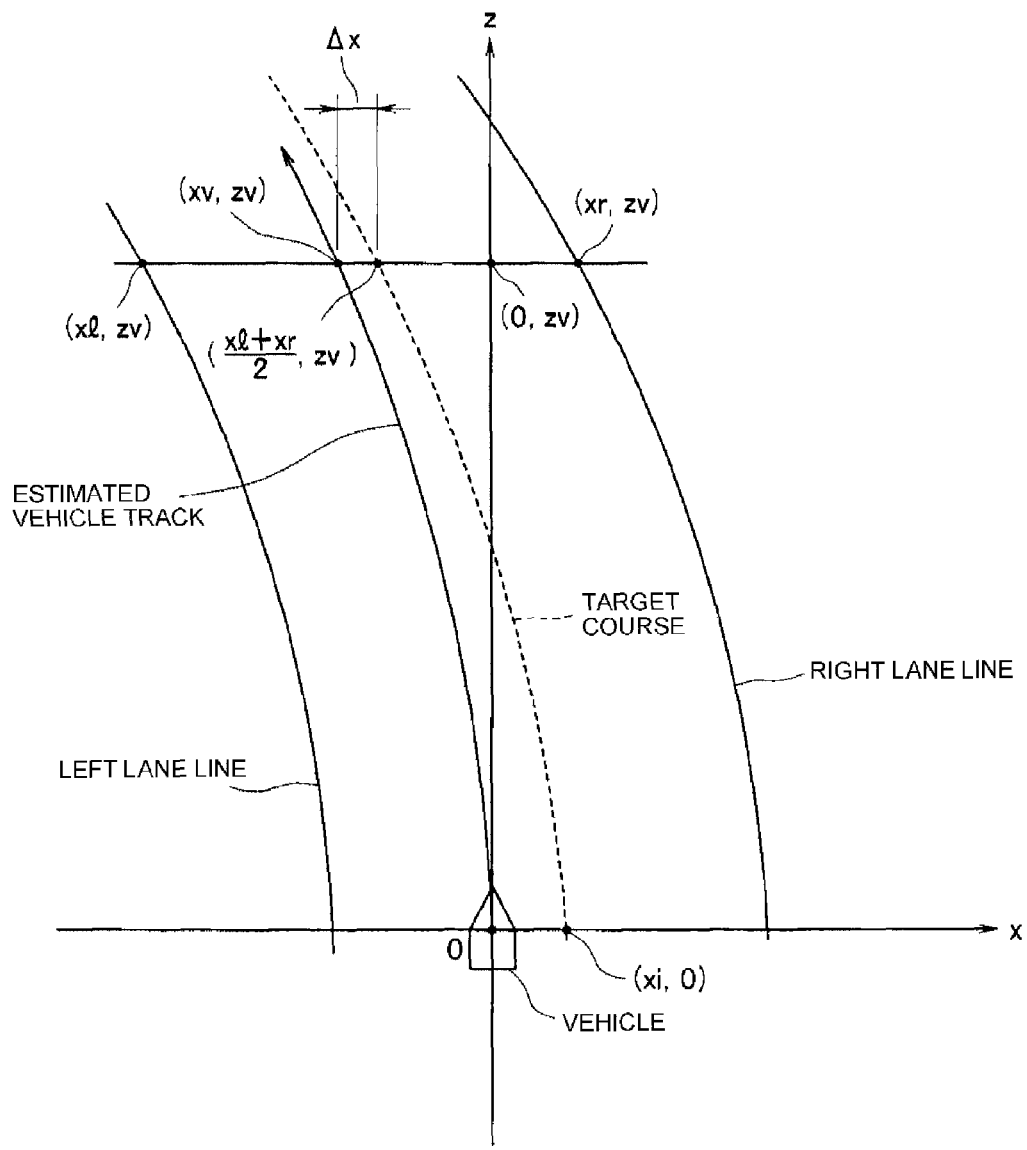
FIG. 6 is an explanatory diagram of a lateral position feedback control according to the example of the present invention.

In recognition of lane line data, on the basis of knowledge that a lane line has high luminance compared with a road surface, a luminance change in the width direction of a road is evaluated to specify the positions of left and right lane lines on an image plane are specified on the image plane. Positions (x, y, z) on an actual space of the lane lines are calculated with a well-known coordinate conversion formula on the basis of positions (i, j) on the image plane and a parallax calculated concerning the positions, that is, on the basis of the distance information. In a coordinate system of the actual space set with reference to the position of the vehicle, in this example, for instance, as illustrated in FIG. 6, a road surface right below the center of a stereo camera is set as the origin, the vehicle width direction is set as the x axis, the vehicle height direction is set as the y axis, and the vehicle length direction (the distance direction) is set as the z axis. In this case, when the road is flat, an x-z plane (y=0) coincides with the road surface. A road model is represented by dividing a traveling lane of the vehicle on the road into a plurality of sections in the distance direction and approximating as predetermined and connecting left and right lane lines in the sections. In this example, an instance is described in which the shape of the traveling road is recognized on the basis of images from the pair of CCD cameras. Alternatively, the shape of the traveling road may be calculated on the basis of image information from a monocular eye camera or a color camera.

The steering controller 20 sets a motor basic current Ipsb according to steering torque Td performed by a driver on the basis of the input signals. The steering controller 20 calculates, on the basis of the traveling road shape, a feed-forward control amount Iff of the electric motor 12 necessary for traveling along a target course (in this example, the middle of the left lane line and the right lane line) by feed-forward control. The steering controller 20 estimates a vehicle track of the vehicle and calculates a deviation Δx between positions of the estimated vehicle track and the target course at a forward observation point set in advance. The steering controller 20 performs control to eliminate the deviation Δx and calculates a lateral position feedback control amount Ifb for traveling along the target course. The steering controller 20 calculates a yaw angle feedback control amount Ifby for setting a yaw angle of the vehicle to a yaw angle along the target course. Concerning control amounts of feedback control, the steering controller 20 sets a lateral position feedback gain of the lateral position feedback control amount Ifb to be larger when a traveling road width Wr is large than when the traveling road width Wr is small. The steering controller 20 sets a yaw angle feedback gain of the yaw angle feedback control amount Ifby to be larger when the traveling road width Wr is small than when the traveling road width Wr is large. The steering controller 20 adds up these values, calculates an electric motor current value Icmd, outputs the electric motor current value Icmd to the motor driver 21, and controls to drive the electric motor 12.

Figure 2:
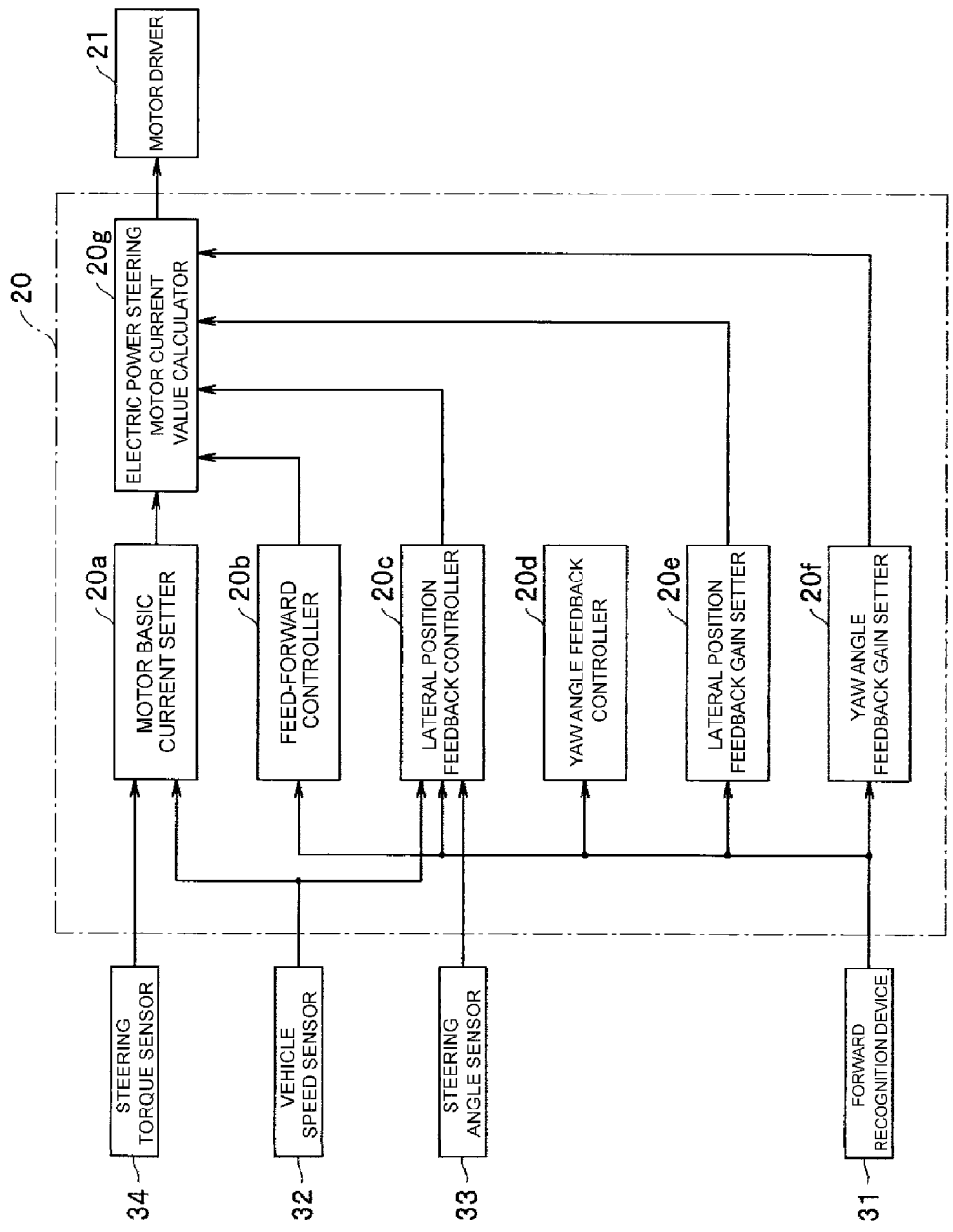
FIG. 2 is a functional block diagram of a steering controller according to the example of the present invention.

Therefore, the steering controller 20 mainly includes, as illustrated in FIG. 2, a motor basic current setter 20a, a feed-forward controller 20b, a lateral position feedback controller 20c, a yaw angle feedback controller 20d, a lateral position feedback gain setter 20e, a yaw angle feedback gain setter 20f, and an electric power steering motor current value calculator 20g.

The motor basic current setter 20a receives the vehicle speed V from the vehicle speed sensor 32 and receives the steering torque Td from the steering torque sensor 34. For instance, the motor basic current setter 20a sets the electric motor basic current value Ipsb with reference to, for instance, a characteristic map of the steering torque Td—the electric motor basic current value Ipsb illustrated in FIG. 4 set in advance and outputs the electric motor basic current value Ipsb to the electric power steering motor current value calculator 20g.

The feed-forward controller 20b receives the recognized image information from the forward recognition device 31. The feed-forward controller 20b uses, for instance, Expression (1) below to calculate the feed-forward control amount (current value) Iff of the electric motor 12 necessary for traveling along the target course and output the feed-forward control amount (current value) Iff to the electric power steering motor current value calculator 20g.

$$Iff = Giff \cdot \kappa \qquad (1)$$

where, κ indicates a lane curvature indicated by, for instance, Expression (2) below.

$$\kappa = (\kappa l + \kappa r)/2 \qquad (2)$$

Figure 5:
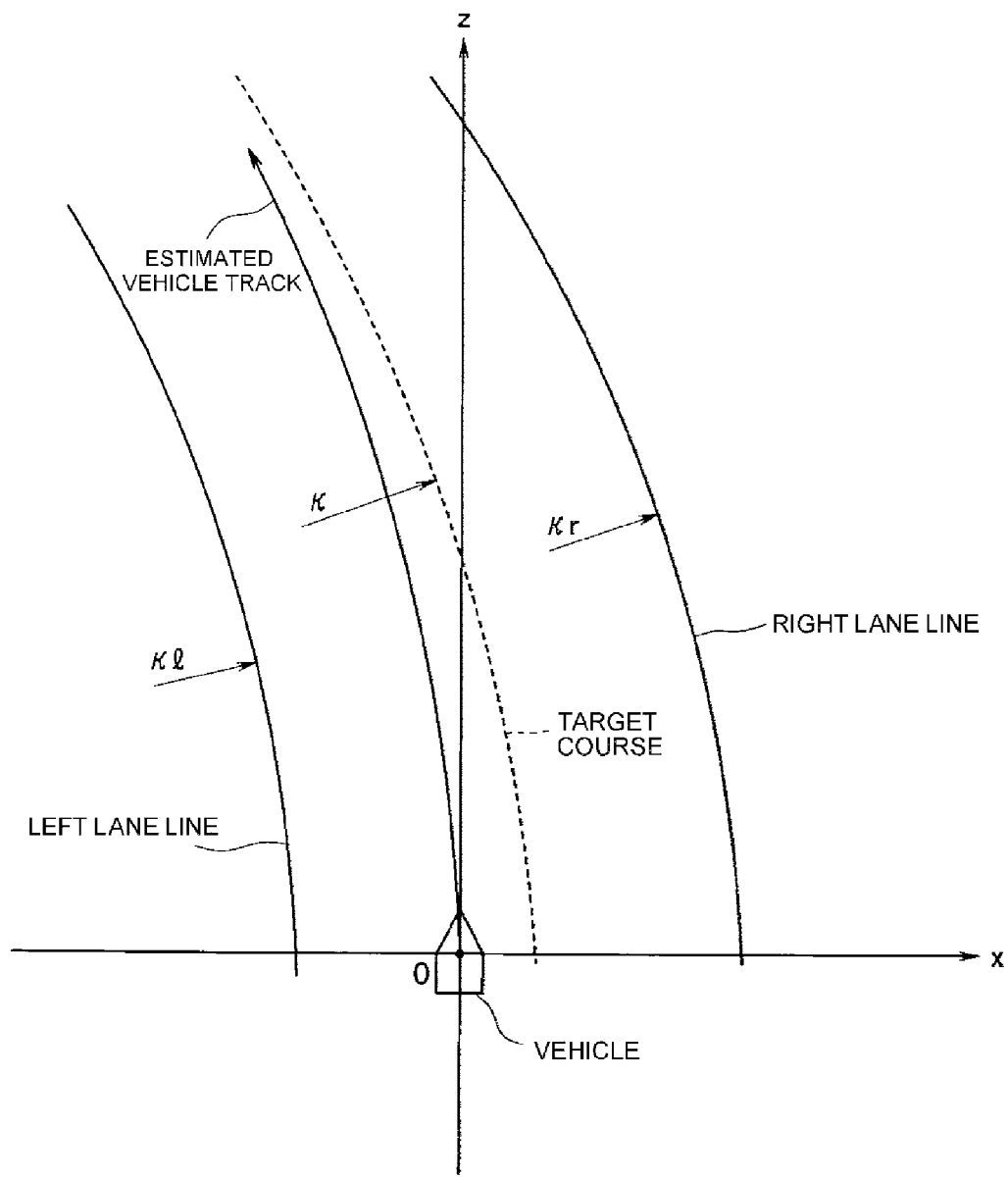
FIG. 5 is an explanatory diagram of feed-forward control according to the example of the present invention.

In Expression (2), κl indicates a curvature component by the left lane line and κr indicates a curvature component by the right lane line. Specifically, the curvature components κl and κr of the left and right lane lines are set by using a coefficient of a quadratic term calculated by a quadratic least square method concerning points respectively forming the left and right lane lines illustrated in FIG. 5. For instance, when a lane line is approximated by a quadratic expression $x=A \cdot z^2+B \cdot z+C$, a value of $2 \cdot A$ is used as a curvature component. Note that the curvature components κl and κr of the lane lines may be curvatures of the respective lane lines. Giff in Expression (1) indicates a feed-forward gain set in advance by an experiment, an arithmetic operation, or the like. In this way, the feed-forward controller 20b is provided as the feed-forward controller in claims.

The lateral position feedback controller 20c receives the recognized image information from the forward recognition device 31, receives the vehicle speed V from the vehicle speed sensor 32, and receives the steering angle θp from the steering angle sensor 33. The lateral position feedback controller 20c calculates the lateral position feedback control amount (current value) Ifb according to Expression (3) below and outputs the lateral position feedback control amount Ifb to the electric power steering motor current value calculator 20g.

$$Ifb = Gifb \cdot \Delta x \tag{3}$$

where, Gifb indicates a gain set in advance by an experiment, an arithmetic operation, or the like. $\Delta x$ is calculated by Expression (4) below as illustrated in FIG. 6.

$$\Delta x = (xl+xr)/2 - xv \tag{4}$$

In Expression (4), xv indicates an x coordinate of an estimated vehicle track in a z coordinate of a forward observation point (0, zv) of the vehicle. A forward observation distance (a z coordinate) zv of the forward observation point (0, zv) is calculated by $zv = T \cdot V$ in this example. T indicates a prediction time set in advance and is set to, for instance, 1.2 sec.

Therefore, when specifications of the vehicle, a stability factor As unique to the vehicle, and the like are used on the basis of a traveling state of the vehicle, xv can be calculated by, for instance, Expression (5) below.

$$xv = (1/2) \cdot (1/(1+As \cdot V^2)) \cdot (\theta p/Lw) \cdot (T \cdot V)^2 \tag{5}$$

where, Lw indicates a wheel base. In Expression (4), xl indicates an x coordinate of the left lane line in the z coordinate of the forward observation point (0, zv) and xr indicates an x coordinate of the right lane line in the z coordinate of the forward observation point (0, zv).

Note that xv can also be calculated by Expression (6) below using the vehicle speed V and a yaw rate (dθ/dt) or can also be calculated by Expression (7) below on the basis of image information.

$$xv = (1/2) \cdot ((d\theta/dt)/V) \cdot (V \cdot T)^2 \tag{6}$$

$$xv = (1/2) \cdot \kappa \cdot (V \cdot T)^2 \tag{7}$$

In this way, the lateral position feedback controller 20c is provided as the lateral position feedback controller in claims.

Figure 7:
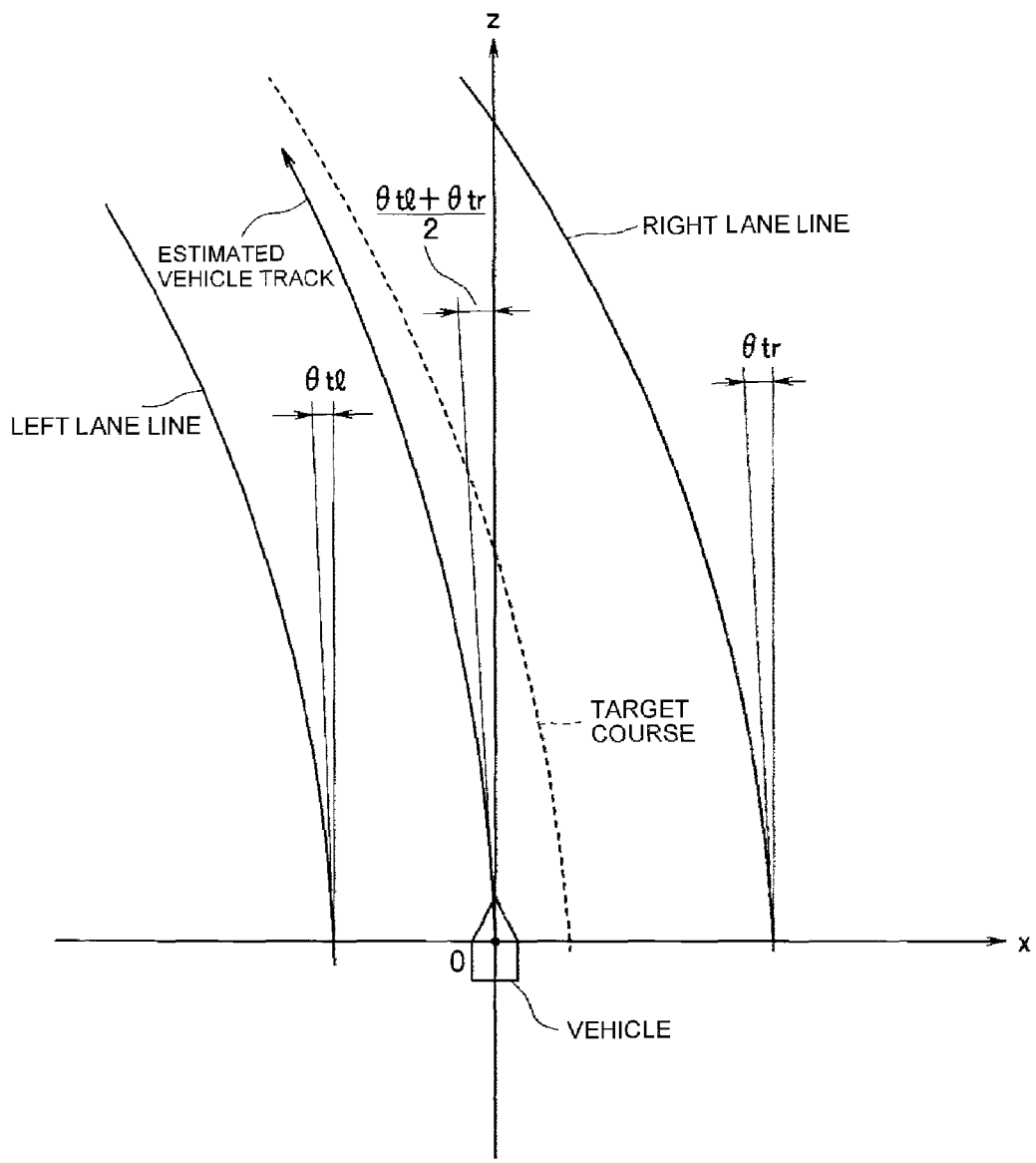
FIG. 7 is an explanatory diagram of a yaw angle feedback control according to the example of the present invention.

The yaw angle feedback controller 20d receives the recognized image information from the forward recognition device 31. The yaw angle feedback controller 20d then uses, for instance, Expression (8) below, to calculate the yaw angle feedback control amount (current value) Ifby for feedback-controlling a yaw angle of the vehicle to a yaw angle along the target course and outputs the yaw angle feedback control amount (current value) Ifby to the electric power steering motor current value calculator 20g.

$$Ifby = Gifby \cdot (\theta tl + \theta tr)/2 \tag{8}$$

where, Gifby indicates a gain set in advance by an experiment, an arithmetic operation, or the like, θtl indicates a tilt of the vehicle with respect to the left lane line by the image information from the forward recognition device 31, θtr is a tilt of the vehicle with respect to the right lane line by the image information from the forward recognition device 31 (see FIG. 7). Note that, as θtl and θtr, for instance, a coefficient of a linear term (i.e., a value of B obtained when a lane line is approximated by an expression $x=A \cdot z^2+B \cdot z+C$) calculated by a quadratic least square method with respect to points of the lane line obtained by the image information may be used. In this way, the yaw angle feedback controller 20d is provided as the yaw angle feedback controller in claims.

The lateral position feedback gain setter 20e receives the recognized image information from the forward recognition device 31. The lateral position feedback gain setter 20e calculates the traveling road width Wr from, for instance, the interval between the left lane line and the right lane line on the basis of the image information and compares the traveling road width Wr with the reference width C set in advance. As a result of the comparison, when the traveling road width Wr is larger than the reference width C (Wr>C) and it can be determined that the traveling road is a traveling load having the large traveling road width Wr like an expressway, the lateral position feedback gain setter 20e sets a lateral position feedback gain Gfb1 of a large value as a lateral position feedback gain Gfb that is multiplied with the lateral position feedback control amount Ifb. Conversely, when the traveling road width Wr is equal to or smaller than the reference width C (Wr≤C) and it can be determined that the traveling road is a traveling load having the small traveling road width Wr like a general road, the lateral position feedback gain setter 20e sets a lateral position feedback gain Gfb2 of a small value as the lateral position feedback gain Gfb that is multiplied with the lateral position feedback control amount Ifb. That is, Gfb1>Gfb2. An influence degree of the lateral position feedback control amount Ifb is set higher when the traveling road width Wr is large than when the traveling road width Wr is small. The lateral position feedback gain Gfb set in this way is output to the electric power steering motor current value calculator 20g. In this way, the lateral position feedback gain setter 20e is provided as the lateral position feedback gain setter in claims.

The yaw angle feedback gain setter 20f receives the recognized image information from the forward recognition device 31. The yaw angle feedback gain setter 20f calculates the traveling road width Wr from, for instance, the interval between the left lane line and the right lane line on the basis of the image information and compares the traveling road width Wr with the reference width C set in advance. As a result of the comparison, when the traveling road width Wr is larger than the reference width C (Wr>C) and it can be determined that the traveling road is a traveling load having the large traveling road width Wr like an expressway, the yaw angle feedback gain setter 20f sets a yaw angle feedback gain Gfby1 of a small value as a yaw angle feedback gain Gfby that is multiplied with the yaw angle feedback control amount Ifby. Conversely, when the traveling road width Wr is equal to or smaller than the reference width C (Wr≤C) and it can be determined that the traveling road is a traveling load having the small traveling road width Wr like a general road, the yaw angle feedback gain setter 20f sets a yaw angle feedback gain Gfby2 of a large value as the yaw angle feedback gain Gfby that is multiplied with the yaw angle feedback control amount Ifby. That is, Gfby1<Gfby2. An influence degree of the yaw angle feedback control amount Ifby is set higher when the traveling road width Wr is small than when the traveling road width Wr is large. The yaw angle feedback gain Gfby set in this way is output to the electric power steering motor current value calculator 20g. In this way, the yaw angle feedback gain setter 20f is provided as the yaw feedback gain setter in claims.

The electric power steering motor current value calculator 20g receives the electric motor basic current value Ipsb from the motor basic current setter 20a, receives the feed-forward control amount Iff from the feed-forward controller 20b, receives the lateral position feedback control amount Ifb from the lateral position feedback controller 20c, receives the yaw angle feedback control amount Ifby from the yaw angle feedback controller 20d, receives the lateral position feedback gain Gfb from the lateral position feedback gain setter 20e, and receives the yaw angle feedback gain Gfby from the yaw angle feedback gain setter 20f. The electric power steering motor current value calculator 20g calculates the electric motor current value Icmd according to, for instance, Expression (9) below, outputs the electric motor current value Icmd to the motor driver 21, and controls to drive the electric motor 12.

$$Icmd = Ipsb + Iff + Gfb \cdot Ifg + Gfby \cdot Ifby \qquad (9)$$

Figure 3:
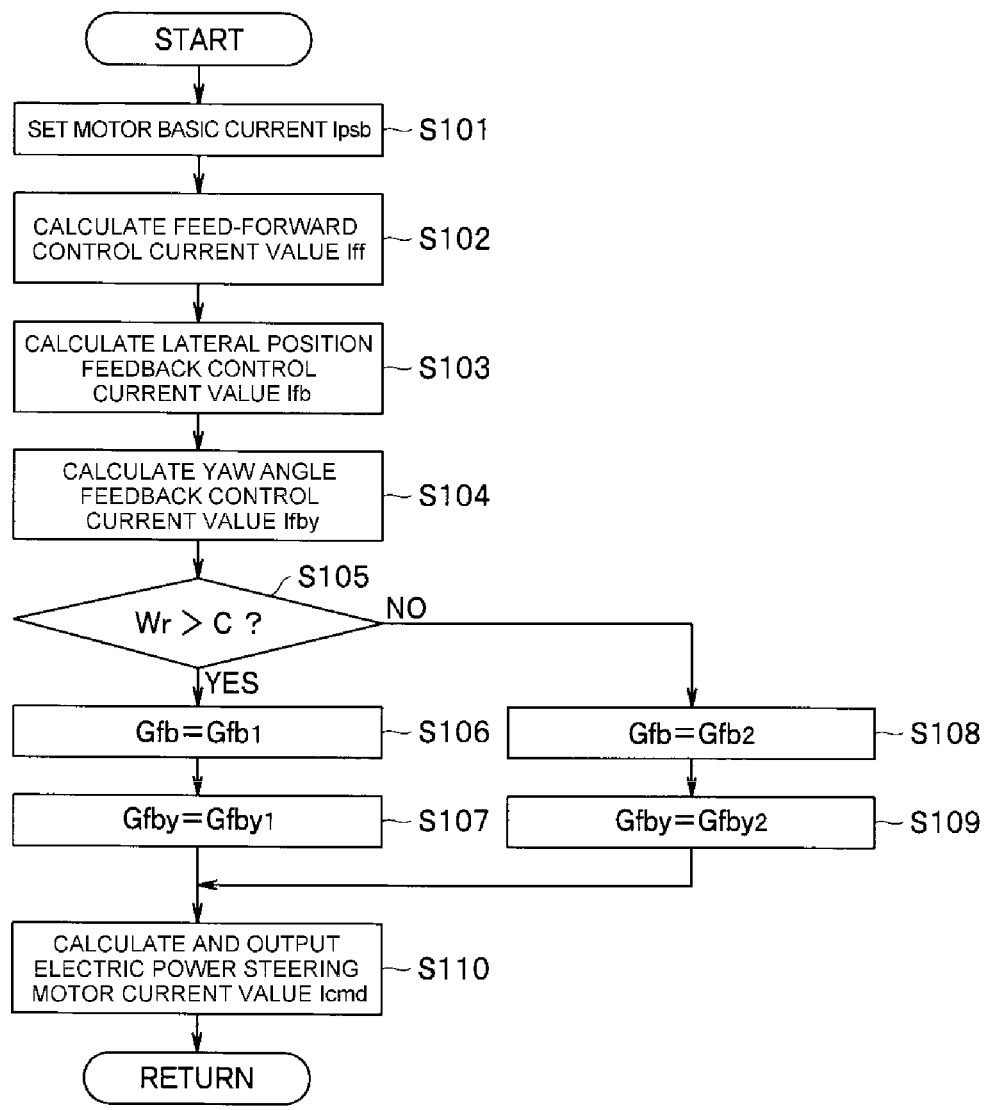
FIG. 3 is a flowchart of a lane keeping control program according to the example of the present invention.

Lane keeping control executed by the steering controller 20 is described with reference to a flowchart of FIG. 3.

Figure 4:
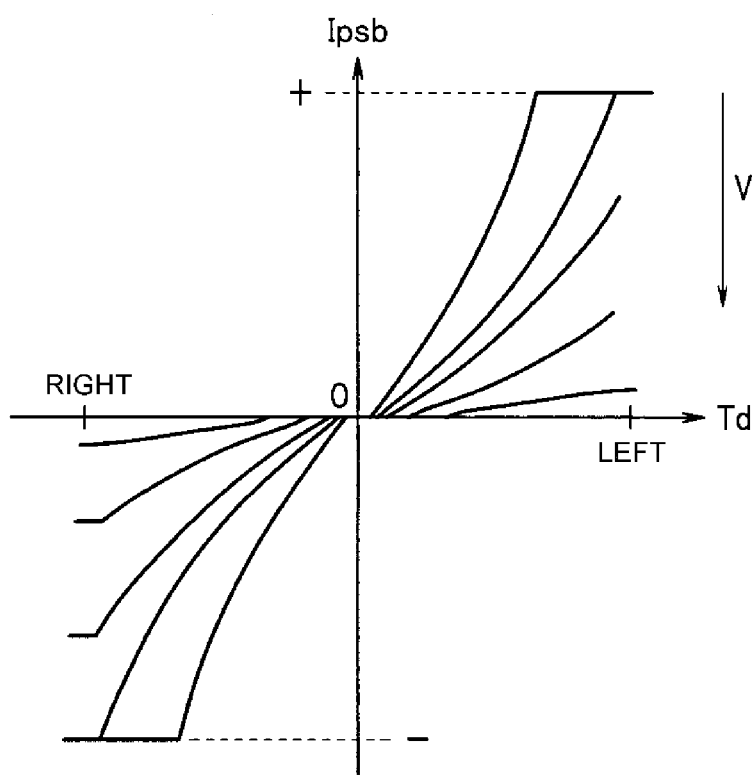
FIG. 4 is an explanatory diagram illustrating an example of a characteristic of a steering torque—an electric motor basic current value of an electric power steering motor according to the example of the present invention.

First, in step (hereinafter abbreviated as "S") 101, the motor basic current setter 20a sets the electric motor basic current value Ipsb referring to the characteristic map of the steering torque Td—the electric motor basic current value Ipsb illustrated in FIG. 4 set in advance.

Subsequently, in S102, the feed-forward controller 20b uses, for instance, Expression (1), to calculate the feed-forward control amount (current value) Iff of the electric motor 12 necessary for traveling along the target course.

Subsequently, in S103, the lateral position feedback controller 20c calculates the lateral position feedback control amount (current value) Ifb according to, for example, Expression (3).

Subsequently, in S104, the yaw angle feedback controller 20d calculates the yaw angle feedback control amount (current value) Ifby according to, for example, Expression (8).

Subsequently, in S105, the lateral position feedback gain setter 20e and the yaw angle feedback gain setter 20f compare the traveling road width Wr with the reference width C set in advance. As a result of the comparison, when the traveling road width Wr is larger than the reference width C (Wr>C) and it can be determined that the traveling road is a traveling load having the large traveling road width Wr like an expressway, the processing proceeds to S106, where the lateral position feedback gain setter 20e sets the lateral position feedback gain Gfb1 of a large value as the lateral position feedback gain Gfb that is multiplied with the lateral position feedback control amount Ifb (Gfb=Gfb1).

Subsequently, in S107, the yaw angle feedback gain setter 20f sets the yaw angle feedback gain Gfby1 of a small value as the yaw angle feedback gain Gfby that is multiplied with the yaw angle feedback control amount Ifby (Gfby=Gfby1).

On the other hand, as a result of the comparison in S105, when the traveling road width Wr is equal to or smaller than the reference width C (Wr≤C) and it can be determined that the traveling road is a traveling load having the small traveling road width Wr like a general road, the processing proceeds to S108, where the lateral position feedback gain setter 20e sets the lateral position feedback gain Gfb2 of a small value as the lateral position feedback gain Gfb that is multiplied with the lateral position feedback control amount Ifb (Gfb=Gfb2). Here, Gfb1>Gfb2.

Subsequently, in S109, the yaw angle feedback gain setter 20f sets the yaw angle feedback gain Gfby2 of a large value as the yaw angle feedback gain Gfby that is multiplied with the yaw angle feedback control amount Ifby (Gfby=Gfby2). Here, Gfby1<Gfby2.

Then, in S110, the electric power steering motor current value calculator 20g calculates the electric motor current value Icmd according to Expression (9), outputs the electric motor current value Icmd to the motor driver 21, controls to drive the electric motor 12, and the processing is exited.

Figure 8A:
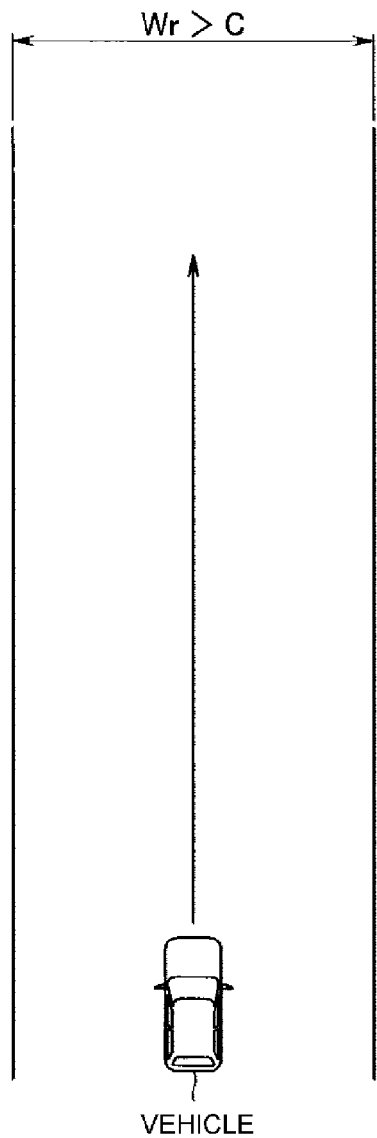
Figure 8B:
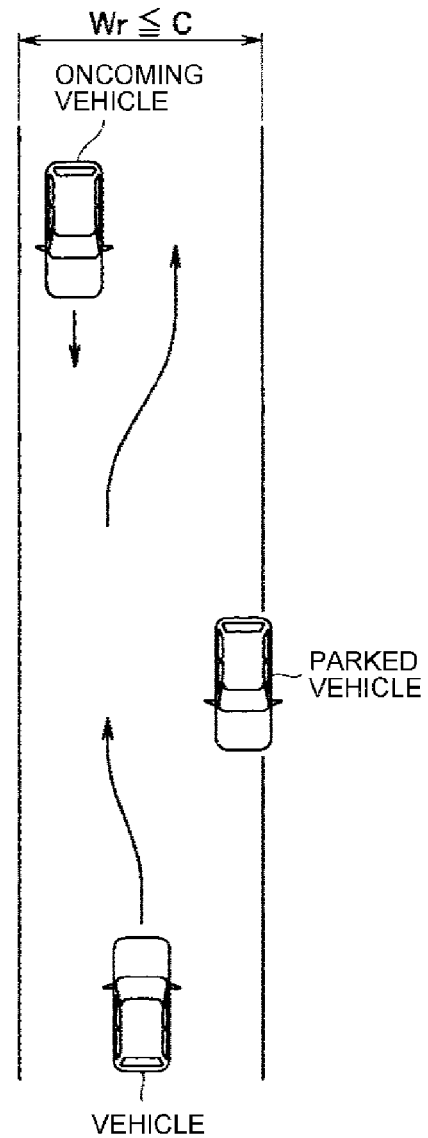

As described above, according to the example of the present invention, the motor basic current Ipsb is set according to the steering torque Td of the driver. The feed-forward control amount Iff of the electric motor 12 necessary for traveling along the target course is calculated by the feed-forward control on the basis of the traveling road shape. The vehicle track of the vehicle is estimated and the deviation Δx between positions of the estimated vehicle track and the target course at the forward observation point set in advance is calculated. The control is performed to eliminate the deviation Δx and the lateral position feedback control amount Ifb for traveling along the target course is calculated. The yaw angle feedback control amount Ifby for setting the yaw angle of the vehicle to the yaw angle along the target course is calculated. Concerning the control amounts of the feedback control, the lateral position feedback gain of the lateral position feedback amount Ifb is set larger when the traveling road width Wr is large than when the traveling road width Wr is small. The yaw angle feedback gain of the yaw angle feedback control amount Ifby is set larger when the traveling road width Wr is small than when the traveling road width Wr is large. These values are added up and the electric motor current value Icmd is calculated. Therefore, as illustrated in FIG. 8A, the lateral position feedback control amount Ifb is set large on a traveling road having a large traveling road width like an expressway so that the feedback control is performed to eliminate deviation from a target course set on the traveling road. Consequently, it is possible to support steering of the driver and perform natural and stable lane keeping control along the target course. On the other hand, as illustrated in FIG. 8B, the lateral position feedback control amount Ifb is set small on a traveling road having a small traveling road width like a general road so that the lane keeping control less interferes with the driver who steers the vehicle while avoiding parked vehicles and oncoming vehicles. Consequently, it is possible to execute optimum lane keeping control taking into account an actual traveling environment. The yaw angle feedback control amount Ifby for controlling the posture of the vehicle is set larger when the traveling road width Wr is small than when the traveling road width Wr is large. Therefore, the driver can easily and stably perform steering for avoiding parked vehicles and oncoming vehicles.

Note that, in this example, the instance is described in which the control amount (the electric motor current value) Icmd for the motor driver 21 is calculated by Expression (9), that is, by adding up Ipsb, Iff, Gfb·Ifb, and Gfby·Ifby. However, the control amount (the electric motor current value) Icmd is not limited to this and may include a control amount (integral correction) for performing feedback control taking into account the influence of disturbances such as cants of the traveling road.

In this example, both of the influence degree of the lateral position feedback control amount Ifb and the influence degree of the yaw angle feedback control amount Ifby are changed according to the traveling road width Wr. Alternatively, only the influence degree of the lateral position feedback control amount Ifb may be changed.

Further, in this example, the traveling road is determined by comparing the traveling road width Wr with the reference width C. Alternatively, for instance, when it can be determined that a type of the traveling road of the vehicle is an expressway from map information and the like of a car navigation system, it may be determined that the vehicle is traveling on a road having a large traveling road width. Conversely, when it can be determined that the type of the traveling road of the vehicle is a general road, it may be determined that the vehicle is traveling on a road having a small traveling road width.

The invention claimed is:

1. A lane keeping control device of a vehicle that sets a target course on which the vehicle is to travel, calculates a control amount for an electric power steering motor on the basis of at least a deviation from the target course, and the control amount being an electric motor current value for the electric power steeting motor, controls the vehicle to travel along the target course, the lane keeping control device of the vehicle comprising:

the lateral position feedback controller that calculates, on the basis of the deviation between the target course a position of an estimated vehicle track of the vehicle, a control amount by feedback control such that the deviation of the position is eliminated; and a lateral position feedback gain setter that sets an influence degree of the control amount by the lateral position feedback controller to be higher when a traveling road width is larger than when the traveling road width is smaller;

a yaw angle feedback controller that calculates on the basis of a deviation of a yaw angle of the vehicle with respect to the target course, the control amount of the feedback control such that the devication of the yaw angle is eliminated; and a yaw angle feedback gain setter that sets influence degree of the control amount by the yaw angle feedback controller to be higher when the travelling road width is smaller than when the travelling road width is larger.

2. The lane keeping control device of a vehicle according to claim 1, wherein the traveling road width is determined according to a type of a traveling road.

3. The lane keeping control device of a vehicle according to claim 2, further comprising a feed-forward controller that calculates, on the basis of a traveling road shape, a control amount necessary for traveling along the target course by feed-forward control.

4. The lane keeping control device of a vehicle according to claim 1, further comprising a feed-forward controller that calculates, on the basis of a traveling road shape, a control amount necessary for traveling along the target course by feed-forward control.

* * * * *